United States Patent
Allison et al.

[11] Patent Number: 5,943,041
[45] Date of Patent: Aug. 24, 1999

[54] FOLDING KEYBOARD

[75] Inventors: Jeffery Daniel Allison, Seattle, Wash.; Winslow Scott Burleson, Palo Alto; Kim Wesley May, San Jose, both of Calif.

[73] Assignee: International Business Machines Corporation, Armonk, N.Y.

[21] Appl. No.: 08/842,138

[22] Filed: Apr. 23, 1997

[51] Int. Cl.⁶ ............................................. B41J 5/10
[52] U.S. Cl. ..................... 345/168; 345/156; 400/472; 400/479; 400/492
[58] Field of Search .................. 345/168, 156; 400/472, 479, 492, 682

[56] References Cited

U.S. PATENT DOCUMENTS

| | | | |
|---|---|---|---|
| 5,644,338 | 7/1997 | Bowen | 345/168 |
| 5,653,543 | 8/1997 | Abe | 345/168 |
| 5,687,058 | 11/1997 | Roylance | 345/168 |
| 5,742,241 | 4/1998 | Crowley et al. | 345/168 |
| 5,841,635 | 11/1998 | Sadler et al. | 345/168 |

*Primary Examiner*—Mark R. Powell
*Assistant Examiner*—Vincent E Kovalick
*Attorney, Agent, or Firm*—John H. Holcombe

[57] ABSTRACT

Disclosed is a folding keyboard of at least two sections, each having an opening therein which is open on the facing ends thereof, and a multilayer sheet for making the electrical connections upon actuation of the keys, the multilayer sheet having substantial stiffness in the flat, planar direction and limited flexibility perpendicular to the planar direction which allows bending about a curvature, the multilayer sheet being fixed in only one of the sections, whereby when the sections are in the open, unfolded position, the multilayer sheet is straightened into a flat, planar shape and registered with the keys of the other sections, and when in the closed, folded position is curved in the perpendicular, cylindrical direction between the sections and slid from the registered position in the other section towards the open facing end thereof. Additionally, the multilayer sheet is cut along any keys which protrude beyond the folding axis so as to allow the cylindrical curving thereof. Further, a coating is provided to assist in the slidability of the multilayer sheet.

23 Claims, 4 Drawing Sheets

FOLDING KEYBOARD

TECHNICAL FIELD

The invention relates to a folding keyboard, and more particularly to a keyboard which permits a standard key layout and which folds into a more compact shape.

BACKGROUND OF THE INVENTION

Keyboards are essential input devices for many applications, including for computers used by individuals. Such individual or "personal" computers are often designed to be transportable and have been occupying less cubic volume over time. A limitation on the reduction in the size of portable personal computers has been the desire of users for a keyboard at least approximating the conventional keyboards known and used with desktop personal computers. Such conventional keyboards typically have an elongated rectangular form with alphanumeric keys arrayed in rows and staggered columns in the standard "QWERTY" layout of typewriters. Usually, such keyboards also have a number of special function keys arrayed around the standard keys.

As efforts have been made toward reducing the size of portable personal computers, some designers have chosen to reduce the size of the keys and thus the keyboards, while others have chosen various ways to fold the keyboards into a more compact arrangement for transportation. Such folded keyboards are best folded along an axis perpendicular to the length of the elongated rectangular form. A problem is that the electrical lines connected to the keys of one of the sections are separated from those connected to the keys on the other section in order to facilitate separating the sections so that they can be folded. Further, only one of the sections is directly connectable to the data processor and to the display. Lastly, the keys comprise staggered rows and offset columns and thus, when folded, leave an irregular edge along the fold, making it very difficult to interconnect the two sections. An example of such a folding keyboard is the Chiu et al., U.S. Pat. No. 5,457,453.

What is needed is a folding keyboard with a means for maintaining the electrical interconnections between the multiple sections, and without rearranging the keys from a standard layout.

SUMMARY OF THE INVENTION

Disclosed is a folding keyboard of at least two sections, each having an opening therein which is open on the facing ends thereof, and a multilayer sheet for making the electrical connections upon actuation of the keys. The multilayer sheet has substantial stiffness in the flat, planar direction and limited flexibility perpendicular to the planar direction which allows bending about a curvature. The multilayer sheet is fixed in only one of the sections, whereby when the sections are in the open, unfolded position, the multilayer sheet is straightened into a flat, planar shape and registered with the keys of the other sections; and when the sections are in the closed, folded position, the multilayer sheet is curved in the perpendicular, cylindrical direction between the sections and slid from the registered position in the other section towards the open facing end thereof.

In addition, the multilayer sheet is cut along any keys, preferably of the fixed section, which protrude beyond the folding axis so as to allow the cylindrical curving of the multilayer sheet and the protrusion to extend through the cut.

Further, the keys additionally comprise force transmission members for transmitting forces from depression actuation of the keys to the multilayer sheet, and the force transmission members or the multilayer sheet are provided with a coating adapted to allow the multilayer sheet to slide against the force transmission members in the flat direction, so that the multilayer sheet is allowed to slide from a registered position in the other sections to a slid position towards the open facing end upon moving the sections from the open, unfolded position to the closed, folded position.

For a fuller understanding of the present invention, reference should be made to the following detailed description taken in conjunction with the accompanying drawings.

DETAILED DESCRIPTION OF THE INVENTION

Incorporation by Reference

Keyboards are essential input devices for many applications, including for personal computers. As described above, such personal computers are often designed to be transportable and have been occupying less cubic volume over time. An example of such a portable personal computer is described in coassigned U.S. Pat. No. 5,198,991, incorporated by reference herein for the purpose of describing the computer per se and the connections between the computer and a folding keyboard, and such description will not be repeated here.

In addition to folding a keyboard to reduce the dimensions for portability, a reduced thickness dimension is also important. A keyboard having a reduced thickness is disclosed in coassigned copending U.S. Patent Application (AM996069). A keyboard assembly is disclosed comprising a planar sheet having a plurality of key faces fixed thereon in a conventional keyboard arrangement, a plurality of cutouts in the planar sheet partially surrounding each key face, and a plurality of living hinges in the planar sheet at one side of each key face extending between the ends of each cutout, whereby the key face may be depressed, causing the key face to pivot about the living hinge to operate a corresponding set of electrical contacts, indicating operation of the key. A conventional rubber spring may transmit the pivot motion of the key face to the electrical contacts. The reduced thickness keyboard is incorporated by reference herein for use with the present invention, as will be explained.

Preferred Embodiments

Figure 1:
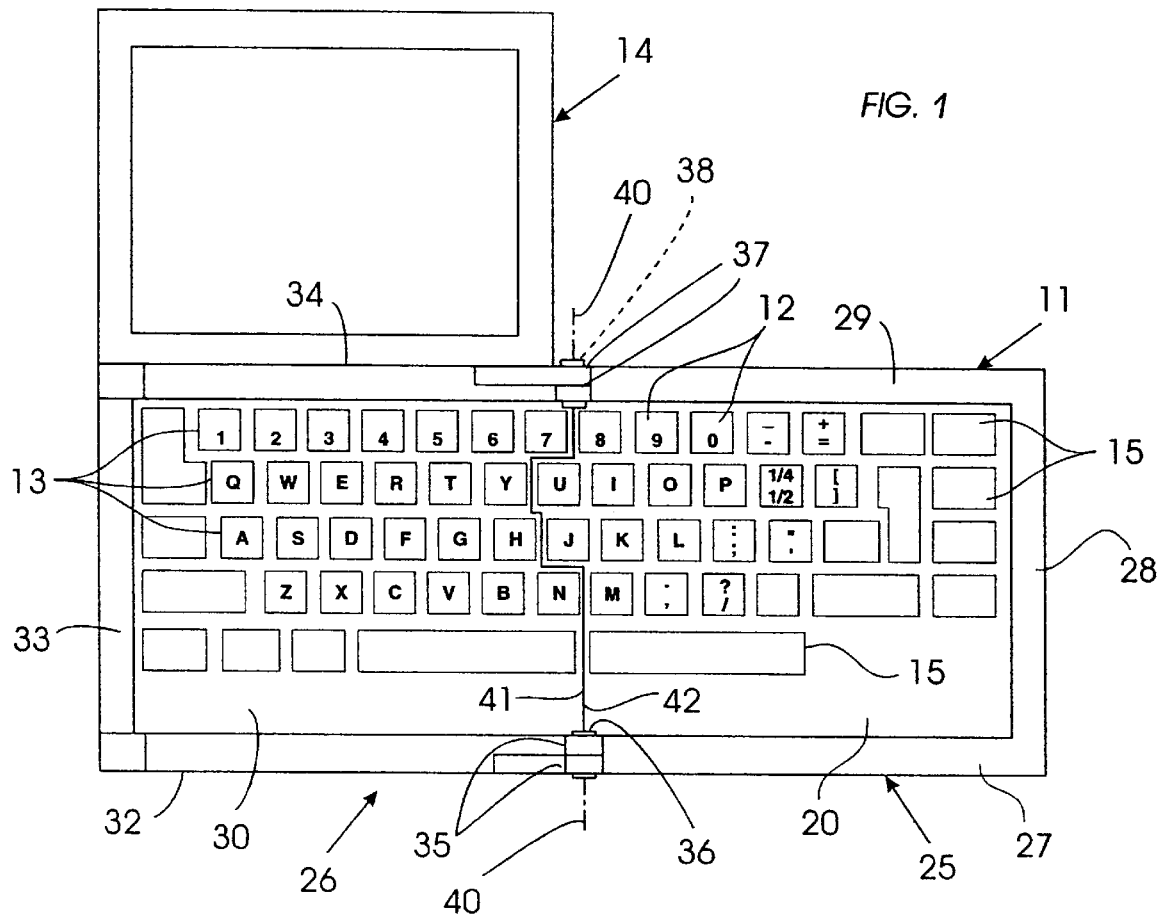
FIG. 1 is a plan view of a keyboard embodying the present invention and with a display and computing device in the open, unfolded position.

Referring first to FIG. 1, the folding keyboard of the present invention, generally indicated at 11, comprises a plurality of depressible keys 12 arranged in rows 13 according to the standard "QWERTY" format wherein the keys of one row are staggered relative to the keys in other rows. The keyboard of the present invention is equally usable with keyboards having other formats.

The keyboard 11 is shown as associated with a display panel 14 for a portable data processor. A typical portable data processor, or "portable personal computer" or "personal digital assistant", has a keyboard panel and a display panel, and the data processor is incorporated within one of the panels. The specific arrangement of the electrical connections between a keyboard, a data processor and a display is described in the '991 patent. The keyboard may be folded and the display panel then folded over the keyboard so that the bottom of the keyboard panel and the back of the display panel form an outer case for the folded unit.

Function keys 15 may be provided in addition to the standard keys 12.

Figure 2:
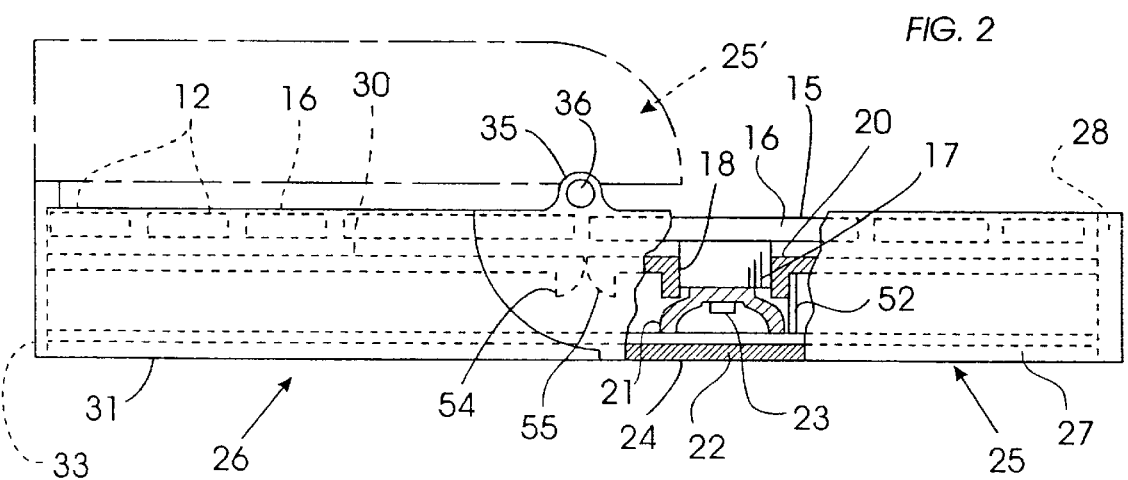
FIG. 2 is a front elevational view of the keyboard of FIG. 1, partly in section, the keyboard being shown in the open, unfolded position.

As shown in FIG. 2, the keys 12 and 15 may be of the conventional plunger type having key tops or keyfaces 16, each key having a key stem 17 slidably mounted in a bearing 18 formed in a key plate 20. Each key is normally held in its raised or quiescent, unoperated position by a force transmission member 21 which rests on a multilayer sheet 22. The force transmission member may comprise an elastomeric spring member which carries a plunger 23 that serves as the force transmission member to transmit the depression force of the key to the multilayer sheet 22. The multilayer sheet 22 rests on a bottom plate 24. Upon depression of a key, the elastomeric spring 21 yields and the plunger 23 compresses the multilayer sheet 22 to bring two normally spaced apart electrical contacts together to complete a circuit leading to the data processor, as described in the '991 patent.

The keyboard is divided into two sections generally indicated at 25 and 26.

Section 25 of the keyboard comprises the bottom plate 24 and the key plate 20 supported by front, side and rear walls 27, 28, and 29, respectively. Section 26 similarly comprises a key plate 30, a bottom plate 31 and front, side and rear walls 32, 33 and 34, respectively.

The front walls 27 and 32 have upstanding lugs 35 which are connected by a pivot pin 36 and the rear walls 29 and 34 are likewise provided with lugs 37 connected by a pivot pin 38. The pins 37 and 38 are aligned with each other to form a pivot axis 40 located above and parallel to the plane of the keyfaces 16.

In the standard "QWERTY" format, the key plates 20 and 30 of the two keyboard sections are formed along complementary jagged edges 41 and 42 which extend between adjacent keys in the central part of the keyboard. Parts of such edges are vertically aligned with the pivot axis 40 and other parts are close thereto.

The keyboard units are of similar widths so that when section 25 is pivoted about axis 40 into its closed, folded condition shown by the dashed lines 25', it substantially covers and is coincident with section 26.

Figure 3:
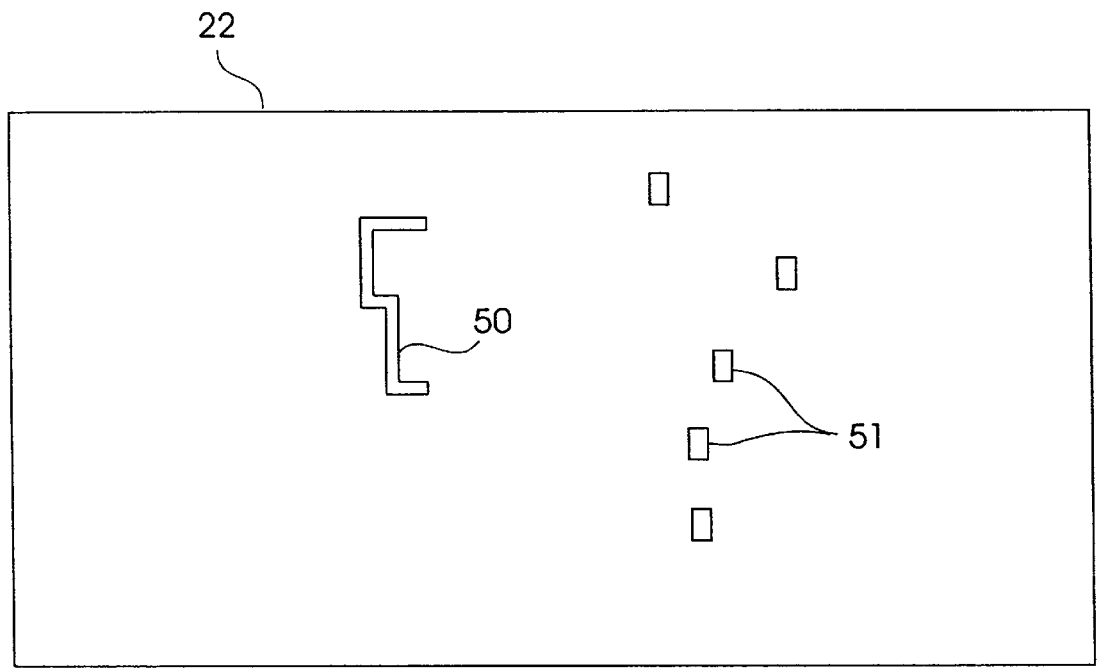
FIG. 3 is a plan view of a multilayer sheet of the present invention.

FIG. 3 illustrates the multilayer sheet 22 of FIG. 2. The multilayer sheet is arranged for making the electrical connections upon actuation of the keys, as will be explained hereinafter. The multilayer sheet has substantial stiffness in the flat, planar direction and limited flexibility perpendicular to the planar direction which allows bending about a curvature. The multilayer sheet is provided with slotted hole 50 and registration holes 51.

Figure 4:
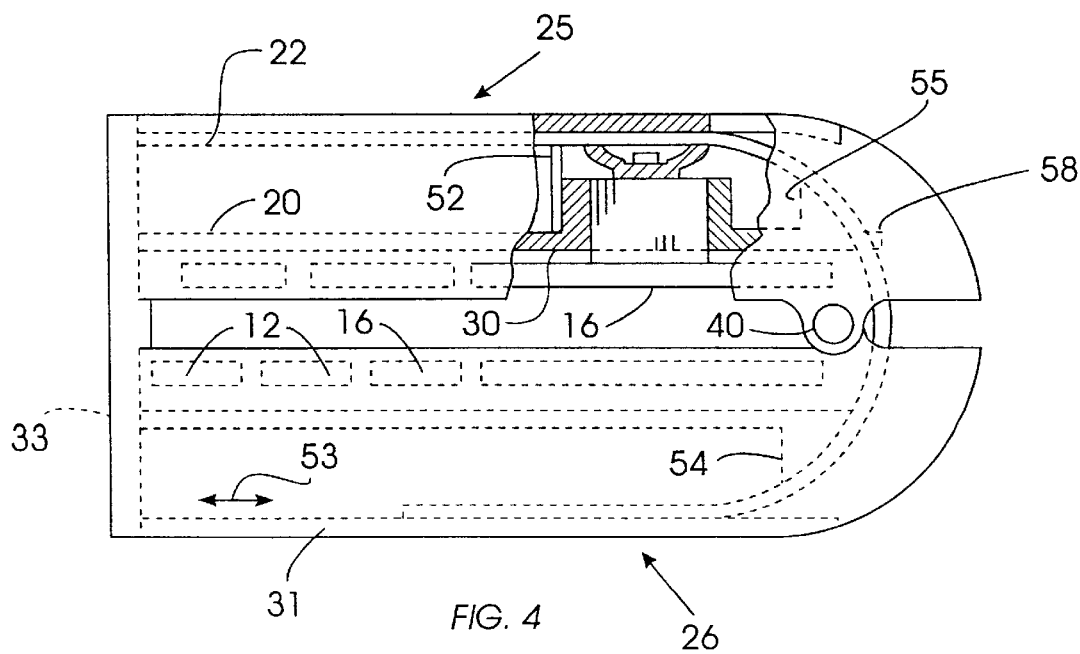
FIG. 4 is a front elevational view of the keyboard of FIG. 1, partly in section, the keyboard being shown in the closed, folded position.

Additionally referring to FIGS. 2 and 4, the registration holes 51 mate with corresponding registration pins in section 25 (registration pin 52 is shown), which hold the multilayer sheet fixed in position in section 25 as section 25 is rotated about pivot 40. As section 25 is rotated about pivot axis 40, the registration of multilayer sheet 22 by pins 51, holding the multilayer sheet in fixed position, together with the rotating motion, pulls the multilayer sheet so that it slides in the planar direction as shown by arrow 53.

Curved supports 54 and 55 are provided on key plates 30 and 20, respectively, to support the multilayer sheet 22 as it is slidably withdrawn from section 26 and curved about the pivot axis.

Referring additionally to FIG. 1, hole 50 in multilayer sheet 22 is arranged to correspond to the extension 58 to key plate 20 to accommodate the "U" and "J" keys. Thus, as the multilayer sheet is slidably withdrawn from section 26 and wrapped about curved supports 54 and 55, extension 58 protrudes through hole 50.

As the keyboard is pivoted to the open, flat position, the multilayer sheet is pushed back in the flat, planar direction illustrated by arrow 53, so that when the keyboard is fully opened, as shown in FIG. 2, the multilayer sheet is again registered with the keys 12 of section 26.

Force transmission members 21 may also comprise springs and may exert a force on the multilayer sheet. In a preferred embodiment, the springs are arranged so as to be in substantially a relaxed state when the keys are in the quiescent, unoperated state. Thus, the pressure is small. A coating is preferably provided on the force transmission members, such as an epoxy, so that a harder, slippery surface is presented to the multilayer sheet 22, allowing the multilayer sheet to slide easily. As an alternative, as will be described, the force transmission members may be provided on a common sheet, to which the coating is instead provided.

Alternatively, the multilayer sheet is provided with the coating.

Still alternatively, the coatings may provide a sufficiently low coefficient of friction that the keys may be compressed when the keyboard is folded so as to be even thinner. The keyboard section keys may have an interference fit when folded so the keys are compressed only at the last stage of folding the keyboard, exerting pressure on multilayer sheet 22 just as the sliding motion ends.

Figure 5:
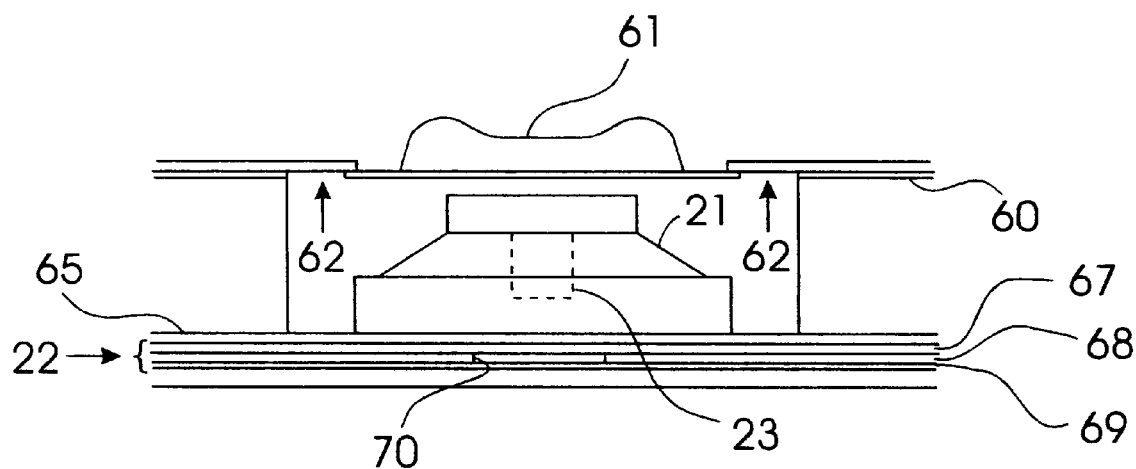
FIG. 5 is a front elevational view of a key of a reduced height keyboard which may be used in the keyboard of the present invention, partly in section.
Figure 6:
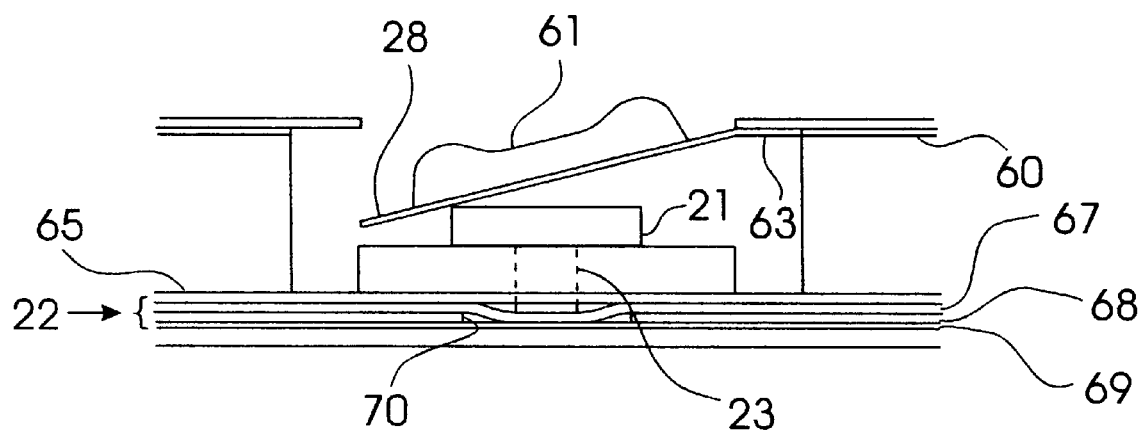
FIG. 6 is a side elevational view of the key of FIG. 5 in the depressed, actuated position, partly in section.
Figure 7:
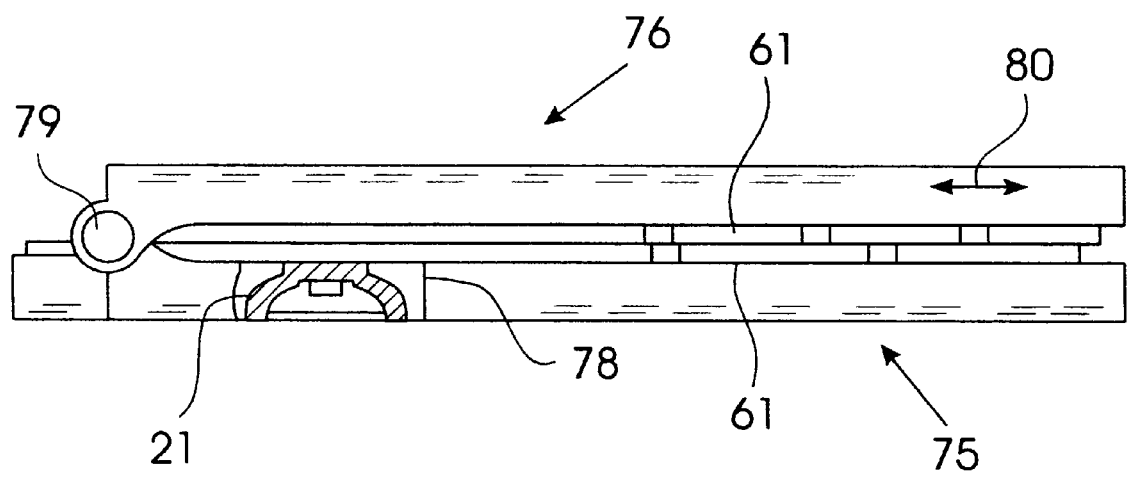
FIG. 7 is a front elevational view of a keyboard of the present invention, using the keys of FIGS. 5 and 6, shown in the closed, folded position.

FIGS. 5–7 illustrate a keyboard having a reduced thickness dimension for portability. A keyboard having a reduced thickness is disclosed in coassigned copending U.S. Patent Application (AM996069), incorporated by reference herein.

FIG. 5 is a front elevational view of a key of the reduced thickness keyboard, FIG. 6 is a side elevational view of the key of FIG. 5 in the depressed, actuated position, and FIG. 7 is a front elevational view of a keyboard of the present invention, using the keys of FIGS. 5 and 6, the keyboard shown in the closed, folded position.

The keyboard of the incorporated application has a planar sheet 60 with a plurality of key faces 61 fixed thereon, a plurality of cutouts 62 in the planar sheet partially surrounding each key face, and a plurality of living hinges 63 in the planar sheet at one side of each key face extending between the ends of each cutout. Thus, as the key face 61 is depressed, it pivots about the living hinge 63 to depress a force transmission member 21.

The force transmission member may be the same as force transmission member 21 illustrated in FIGS. 2 and 4, for transmitting the pivot motion of the key face to the multilayer sheet 22 of the present invention. Force transmission member 21 and multilayer sheet 22 are described in greater detail with respect to FIGS. 5 and 6. Specifically, force transmission members 21 may be individually provided and positioned on top of multilayer sheet 22. In the present invention, the force transmission members are preferably conventional springs or domes positioned on a common sheet 65 and preferably affixed thereto by cementing. The common sheet may be made of Mylar.

Alternatively, the common sheet 65 and all of the springs may comprise a single manufacture. Optimally the springs or domes are made of rubber, but any suitable material may be used.

Rubber spring or force transmission member 21 has a center probe 23 extending downward from the top thereof which serves as the force transmission member. The sheet 65 has suitable holes therethrough for the center probe 23 to enter upon depression of keyface 61.

Multilayer sheet 22 comprises a set of electrical contact members comprising sheets 67, 68 and 69. Sheet 67 comprises an uppermost contact member having electrical leads on the bottom side thereof, which connect to the data processor. Sheet 67 is made of an insulating material, preferably also Mylar, and is conventionally used in portable data processors. Sheet 68 comprises an insulating member having openings 70 therein corresponding to the keyfaces 11. Sheet 68 is also conventionally used in portable data processors and is preferably made of Mylar. Sheet 69 is similar to contact member sheet 67 and comprises a lowermost contact member having electrical leads on the top side thereof, which also connect to the data processor. An electrical lead of contact member sheet 67 and an electrical lead of contact member sheet 69 overlie one another at the location of opening 70 in insulating sheet 68, and are normally separated as shown in FIG. 5.

The probe 23 of force transmission member 21 transmits vertical force from the keyface 61 of the planar sheet 60 to uppermost contact member sheet 67 as illustrated in FIG. 6. The transmitted force by center probe 23 causes uppermost contact member sheet 67 to be pushed into the hole 70 in insulating sheet 68 and into contact with the lowermost contact member sheet 68. The electrical lead on the bottom of uppermost contact member sheet 67 is thereby pressed into contact with the electrical lead on the top of lowermost contact member sheet 68. This contact creates a connection between one of the lines on contact member sheet 67 and one of the lines on contact member sheet 69, which connection signals the operation of the depressed keyface 61.

The functioning of the sliding multilayer sheet 22 in the keyboard of FIGS. 5–7 is similar to that of FIGS. 1, 2 and 4. The curved supports of the thicker keyboard of FIGS. 2 and 4 do not need to be provided for either section 75 or section 76 of the keyboard of FIG. 7 in that the keyfaces 61 and a faceplate thereon may provide adequate support for the multilayer sheet 22 as it slides and curves during folding.

A set of registration pins 78 may be provided for registration with corresponding registration holes 51 in the multilayer sheet so as to hold the multilayer sheet fixed in position in section 75 as section 75 is rotated about pivot 79. As section 75 is rotated about the pivot 79, the registration of multilayer sheet 22 by pins 78, holding the multilayer sheet in fixed position, together with the rotating motion, pulls the multilayer sheet so that it slides in the planar direction as shown by arrow 80 ending at the slid position shown in FIG. 7.

As the keyboard is pivoted to the open, flat position, the multilayer sheet is pushed back in the flat, planar direction illustrated by arrow 80, so that when the keyboard is fully opened, the multilayer sheet is again registered with the keys 61 of section 76.

Alternatively, registration pins 78 may form a part of a spacer between the planar sheet keys 61 and the multilayer sheet, the spacer having cavities therein for force transmission members 21 or their equivalent.

As described above, force transmission members 21 may also comprise springs and may exert a force on the multilayer sheet. In a preferred embodiment, the springs are arranged so as to be in substantially a relaxed state when the keys are in the quiescent, unoperated state. Thus, the pressure is small. Also, the spacer may exert pressure on the multilayer sheet 22. A coating is therefore preferably provided on the force transmission members and the spacer, such as an epoxy, so that a hard, slippery surface is presented to the multilayer sheet 22, allowing the multilayer sheet to slide easily. As described above, the force transmission members 21 may be provided on a common sheet, to which the coating is instead provided.

Alternatively, the multilayer sheet is provided with the coating.

While the preferred embodiments of the present invention have been illustrated in detail, it should be apparent that modifications and adaptations to those embodiments may occur to one skilled in the art without departing from the scope of the present invention as set forth in the following claims.

We claim:

1. A folding keyboard comprising:

at least two sections, each said section supporting a subset of keys and having an opening therein which is open on the facing ends thereof, said sections being mechanically coupled to each other so as to allow rotation about each other along an axis of rotation between an open, unfolded position in which the sections are substantially coplanar, and a closed position folded over to be substantially adjacent to and parallel to each other; and a multilayer sheet for making electrical connections upon actuation of said keys, said multilayer sheet having substantial stiffness in the flat, planar direction and limited flexibility perpendicular to said planar direction which allows bending about a curvature, said multilayer sheet being fixed in only one of said sections and registered with said keys thereof, whereby when said sections are in said open, unfolded position, said multilayer sheet is straightened into said flat, planar shape and registered with said keys of said other sections, and when in said closed, folded position is curved in said perpendicular direction between said sections and slid from said registered position in said other sections towards said open facing end thereof.

2. The folding keyboard of claim 1, wherein:

said keys are arranged in staggered rows and offset columns along said facing ends; and said multilayer sheet is cut along any said keys which protrude beyond said axis of rotation so as to allow said perpendicular curving thereof.

3. The folding keyboard of claim 1, wherein:

said multilayer sheet is provided with a coating adapted to allow said multilayer sheet to slide against said keys in said flat direction, whereby said multilayer sheet is allowed to slide from said registered position in said other sections to said slid position towards said open facing end upon moving said other sections from said open, unfolded position to said closed, folded position.

4. The folding keyboard of claim 3, wherein:
said keys are arranged in staggered rows and offset columns along said facing ends; and
said multilayer sheet is cut along any said keys which protrude beyond said axis of rotation so as to allow said perpendicular curving thereof.

5. The folding keyboard of claim 1, wherein:
said keys additionally comprise force transmission members for transmitting forces from depression actuation of said keys to said multilayer sheet, said force transmission members provided with a coating adapted to allow said multilayer sheet to slide against said force transmission members in said flat direction, whereby said multilayer sheet is allowed to slide from said registered position in said other sections to said slid position towards said open facing end upon moving said other sections from said open, unfolded position to said closed, folded position.

6. The folding keyboard of claim 5, wherein:
said force transmission members additionally comprise springs for supporting said keys in a quiescent, unoperated position exerting a spring pressure in a direction perpendicular to said flat direction, said springs being in a nearly relaxed state for closing said keyboard, whereby said multilayer sheet is allowed to slide without substantial pressure perpendicular to the direction of said sliding motion.

7. The folding keyboard of claim 6, wherein:
said force transmission members comprise springs affixed to one side of a common sheet, said common sheet having said coating on the opposite side thereof, said opposite side being adjacent said multilayer sheet.

8. The folding keyboard of claim 7, wherein:
said keys are arranged in staggered rows and offset columns along said facing ends; and
said multilayer sheet is cut along any said keys which protrude beyond said axis of rotation so as to allow said perpendicular curving thereof.

9. The folding keyboard of claim 6, wherein:
said sections are mechanically coupled so as to provide an interference fit of said keys in said closed position, whereby said keys are compressed when said sections are in said closed position.

10. The folding keyboard of claim 9, wherein:
said keys are arranged in staggered rows and offset columns along said facing ends; and
said multilayer sheet is cut along any said keys which protrude beyond said axis of rotation so as to allow said perpendicular curving thereof.

11. The folding keyboard of claim 1, wherein:
said keyboard sections substantially abut one another at said facing ends when in said open, unfolded position; and
said multilayer sheet comprises a set of electrical contact member sheets, said set comprising two contact member sheets having electrical contacts on the bottom side of the uppermost sheet and on the top side of the bottommost sheet, separated by a spacer member sheet having a plurality of holes therethrough, each hole aligned with a corresponding one of said keys and aligned with one of said electrical contacts of each of said contact member sheets for making electrical connections therebetween upon actuation of said aligned key.

12. The folding keyboard of claim 11, wherein:
said keys additionally comprise force transmission members for transmitting forces from depression actuation of said keys to said multilayer sheet, whereby said transmitted force causes the electrical contact of said uppermost contact member sheet to be depressed into said hole to make contact with the electrical contact of said lowermost contact member sheet, said force transmission members provided with a coating adapted to allow said multilayer sheet to slide against said force transmission members in said flat direction, whereby said multilayer sheet is allowed to slide from said registered position in said other sections to said slid position towards said open facing end upon moving said other sections from said open, unfolded position to said closed, folded position.

13. The folding keyboard of claim 12, wherein:
said keys are arranged in staggered rows and offset columns along said facing ends; and
said multilayer sheet is cut along any said keys which protrude beyond said axis of rotation so as to allow said perpendicular curving thereof.

14. The folding keyboard of claim 12, wherein:
said force transmission members comprise a sheet of springs on one side, each spring associated with one of said keys, said common sheet having said coating on the opposite side thereof, said opposite side being adjacent said multilayer sheet, said coating adapted to allow said multilayer sheet to slide against said force transmission members in said flat direction, whereby said multilayer sheet is allowed to slide from said registered position in said other sections to said slid position towards said open facing end upon moving said other sections from said open, unfolded position to said closed, folded position.

15. The folding keyboard of claim 14, wherein:
said keys are arranged in staggered rows and offset columns along said facing ends; and
said multilayer sheet is cut along any said keys which protrude beyond said axis of rotation so as to allow said perpendicular curving thereof.

16. The keyboard assembly of claim 11, additionally comprising:
a sheet member supporting said keys;
a spacer between said sheet member and said multilayer sheet electrical contact members and has a cavity therein aligned with a corresponding one of said keys; and
said force transmission members comprise a common sheet of springs on one side, each spring associated with one of said keys, said common sheet having said coating on the opposite side thereof, said opposite side being adjacent said multilayer sheet.

17. The folding keyboard of claim 16, wherein:
said keys are arranged in staggered rows and offset columns along said facing ends; and
said multilayer sheet is cut along any said keys which protrude beyond said axis of rotation so as to allow said perpendicular curving thereof.

18. A portable data processing device comprising:
a display;
a data processor connected to said display; and
a folding keyboard connected to said data processor, said folding keyboard comprising:
at least two sections, each said section supporting a subset of keys and having an opening therein which is open on the facing ends thereof, said sections being mechanically coupled to each other so as to allow rotation about each other along an axis of rotation between an open, unfolded position in which the sections are substantially coplanar, and a closed position folded over to be substantially adjacent to and parallel to each other; and a multilayer sheet for making electrical connections upon actuation of said keys, said multilayer sheet having substantial stiffness in the flat, planar direction and limited flexibility perpendicular to said planar direction which allows bending about a curvature, said multilayer sheet being fixed in only one of said sections and registered with said keys thereof, whereby when said sections are in said open, unfolded position, said multilayer sheet is straightened into said flat, planar shape and registered with said keys of said other sections, and when in said closed, folded position is curved in said perpendicular direction between said sections and slid from said registered position in said other sections towards said open facing end thereof.

19. The portable data processing device of claim 18, wherein:

said keys are arranged in staggered rows and offset columns along said facing ends; and said multilayer sheet is cut along any said keys which protrude beyond said axis of rotation so as to allow said perpendicular curving thereof.

20. The portable data processing device of claim 19, wherein:

said multilayer sheet is provided with a coating adapted to allow said multilayer sheet to slide against said keys in said flat direction, whereby said multilayer sheet is allowed to slide from said registered position in said other sections to said slid position towards said open facing end upon moving said other sections from said open, unfolded position to said closed, folded position.

21. The portable data processing device of claim 19, wherein:

said keys additionally comprise force transmission members for transmitting forces from depression actuation of said keys to said multilayer sheet, said force transmission members provided with a coating adapted to allow said multilayer sheet to slide against said force transmission members in said flat direction, whereby said multilayer sheet is allowed to slide from said registered position in said other sections to said slid position towards said open facing end upon moving said other sections from said open, unfolded position to said closed, folded position.

22. The portable data processing device of claim 21, wherein:

said force transmission members comprise a common sheet of springs on one side, each spring associated with one of said keys, said common sheet having said coating on the opposite side thereof, said opposite side being adjacent said multilayer sheet.

23. The portable data processing device of claim 22, wherein:

said keys are arranged in staggered rows and offset columns along said facing ends; and said multilayer sheet is cut along any said keys which protrude beyond said axis of rotation so as to allow said perpendicular curving thereof.

* * * * *